June 12, 1923.
A. H. BISHOP
1,458,679
CAMP AND LUNCH KIT
Filed Oct. 9, 1920
2 Sheets-Sheet 1
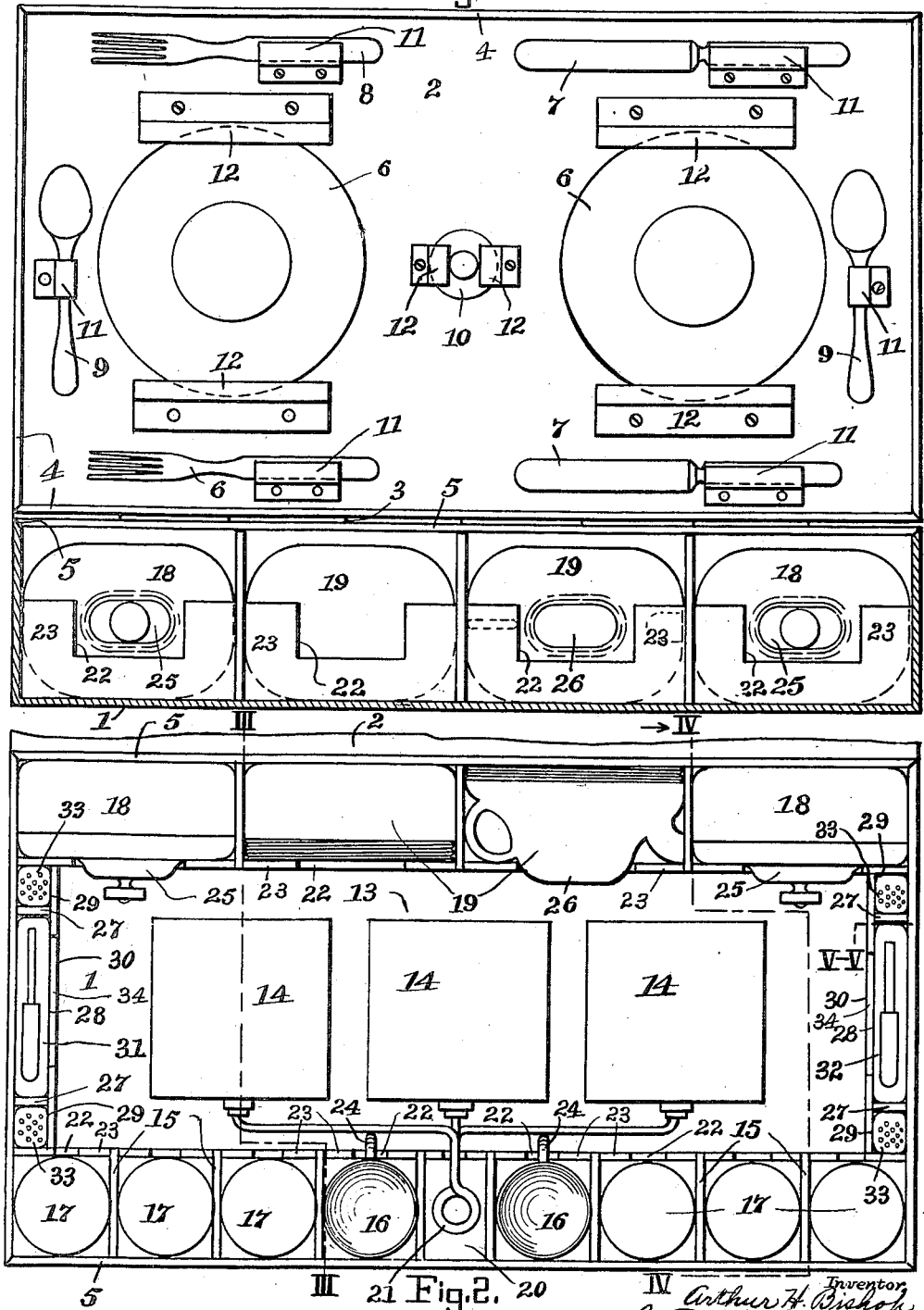

June 12, 1923.
A. H. BISHOP
1,458,679
CAMP AND LUNCH KIT
Filed Oct. 9, 1920
2 Sheets-Sheet 2
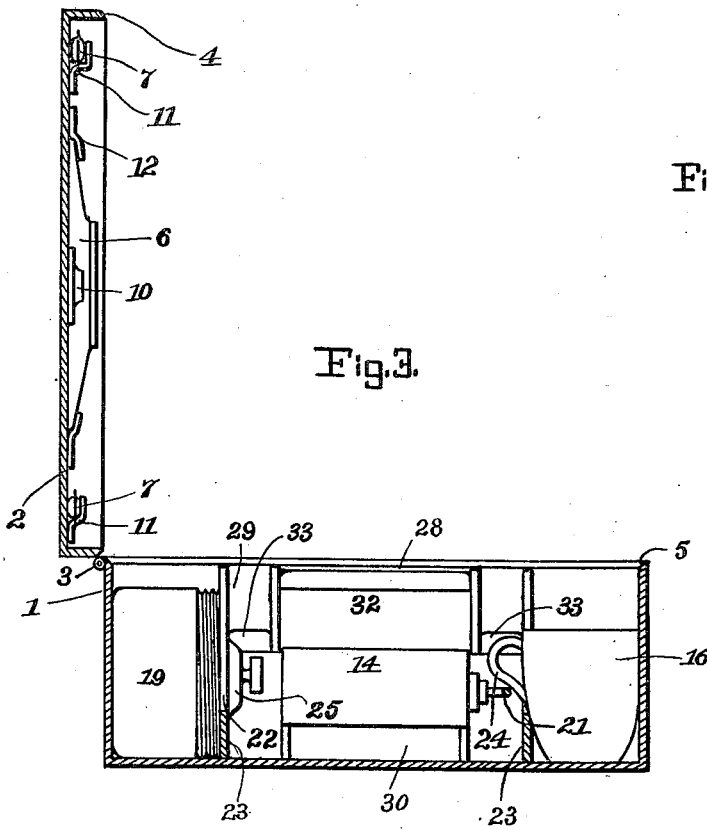
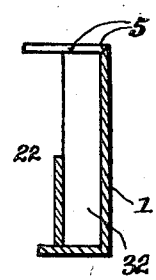
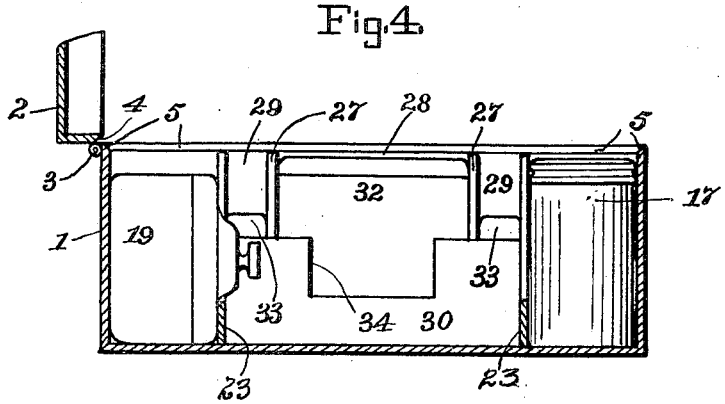

Patented June 12, 1923.

1,458,679

UNITED STATES PATENT OFFICE.

ARTHUR H. BISHOP, OF NEW YORK, N. Y.

CAMP AND LUNCH KIT.

Application filed October 9, 1920. Serial No. 415,856.

*To all whom it may concern:*

Be it known that I, ARTHUR H. BISHOP, a citizen of the United States, and resident of New York, in the county and State of New York, have invented certain new and useful Improvements in Camp and Lunch Kits, of which the following is a full, clear, and exact specification.

This invention relates to camp and lunch kits, and has for its object to provide an improved receptacle for carrying and holding the necessary dishes and utensils for cooking and serving a meal on a camping trip or at home.

The invention contemplates the use of a covered receptacle provided with racks for dishes and knives, forks and spoons in the cover, and racks for dishes and utensils around the sides and ends of the receptacle proper, while in the center of said receptacle there is arranged a heater or cooking stove. A special object is to provide the racks in the receptacle with notches to receive the handles of cups or other utensils which handles are allowed to protrude into the central portion of said receptacle while the racks or pockets are of the proper size to snugly hold the body portions of said cups or utensils and prevent breakage thereof. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a longitudinal vertical section of the receptacle taken just in rear of the heater or cooking stove and showing the cover raised.

Figure 2 is a plan view of the receptacle open and the cover broken away.

Figure 3 is a transverse vertical section of the receptacle and cover with the latter raised, the section being taken on the line III—III of Figure 2.

Figure 4 is a transverse vertical section of the receptacle with the cover broken away, this section being taken on the line IV—IV of Figure 2 and showing the end racks more clearly, and Figure 5 is a detailed section through one of the end racks in the receptacle taken on the line V—V of Figure 2.

The receptacle 1 may be made rectangular in shape and of any desired material and dimensions. The cover 2 may be hinged to the receptacle as at 3 and is made to fit snugly thereon preferably having a beveled edge 4 to engage a correspondingly beveled edge 5 around the margin of said receptacle. The cover is preferably made rather shallow and is designed to hold plates 6, knives 7, forks 8, spoons 9 and the top 10 of a coffee percolator. These knives, forks and spoons are held in place by spring clips 11, one of which is provided for each article and preferably arranged to grip the handle thereof. The plates and top of the coffee percolator are each held by opposed pairs of spring clips 12 arranged to engage the same at diametrically opposite edges or marginal points.

In the receptacle 1 racks are formed or constructed along the sides and ends while in the central space there is stored a cooking stove 13, preferably an electric cooker having a plurality of cooking surfaces or units 14 best shown in Figure 2. The racks along the front and rear edges of the receptacle are separated by vertical partitions 15 spaced to provide the racks or pockets of the desired size for holding cups 16, jars 17 adapted to hold foodstuffs, cooking utensils 18 and parts of a coffee percolator 19. A pocket 20 is also provided for holding the coil of wire 21 leading to the electric cooker. Each rack or pocket is completed by a strip 23 arranged parallel to the front and rear of the receptacle, which strip preferably extends about half the distance from the bottom to the top of said receptacle and has a notch 22 centrally of its upper edge through which the handles 24 of the cups 16, or the tops 25 of the cooking utensils 18, or the reduced upper end 26 of the upper section of the coffee percolator are adapted to extend while the body portions of said cups, utensils, etc., are fitted snugly in the pockets. While only two cups are shown in Figure 2, and the other racks along the front edge of the receptacle are fitted with jars 17, all of the pockets along the front are preferably provided with the notches 22 as shown in order to accommodate a greater number of cups if desired.

At each end of the receptacle between the extremities of the front and rear rows of racks there are constructed a series of racks preferably divided up by vertical partitions 27 into a large middle pocket 28 and two small end pockets 29 all having a common front strip 30 extending about the same height as the strips 23 of the other pockets or racks. The middle pocket 28 at each end of the receptacle is designed to hold a toaster 31 or frying pan 32 to be used on the electric cooker 13 and preferably has a notch 34 in its front strip, while the smaller pockets 29 hold salt and pepper cruets 33. The relative sizes of the pockets may, however, be changed so as to accommodate different utensils if desired.

Having thus described my invention, what I claim as new and desire to secure by Letters Patent of the United States is:—

1. A portable lunch kit having a receptacle, strips fixed along the bottom of said receptacle and arranged parallel to the walls thereof, partitions dividing the space between said strips and the walls into separate racks for holding utensils, there being a notch in each of said strips between adjacent partitions for receiving projecting portions of the utensils when mounted in said racks, and a cover for said receptacle adapted, when closed, to retain said utensils in the receptacle racks.

2. A portable lunch kit having a receptacle, strips fixed along the bottom of said receptacle and arranged parallel to the walls thereof, partitions dividing the space between said strips and the walls into separate racks for holding utensils, said racks extending around the walls of the receptacle and leaving a space in the center between said racks, there being a notch in each of the strips between adjacent partitions for receiving projecting portions of the utensils when mounted in the racks, a cooking stove arranged in the central space in the receptacle surrounded by racks, and a cover for said receptacle adapted, when closed, to retain said utensils and stove in their respective racks and space.

In testimony whereof I have signed my name to this specification.

ARTHUR H. BISHOP.